United States Patent
Breckman

[11] 3,755,811
[45] Aug. 28, 1973

[54] DISCRIMINATING SIGNALING SYSTEM
[75] Inventor: Jack Breckman, Haddonfield, N.J.
[73] Assignee: Radio Corporation of America, New York, N.Y.
[22] Filed: June 10, 1968
[21] Appl. No.: 735,716

[52] U.S. Cl. ...... 343/6.5 R, 343/6.8 R, 343/112 CA
[51] Int. Cl. .............................................. G01s 9/56
[58] Field of Search.................. 343/6.5, 6.8, 112.4, 343/6.5 SS

[56] References Cited
UNITED STATES PATENTS
| | | | |
|---|---|---|---|
| 3,178,706 | 4/1965 | Clock | 343/6.8 |
| 3,290,675 | 12/1966 | Neild | 343/6.5 SS |
| 3,341,845 | 9/1967 | Deman | 343/6.5 |
| 3,377,616 | 4/1968 | Auer, Jr. | 343/6.5 SS X |
| 3,389,391 | 6/1968 | Keeler et al. | 343/6.8 |

Primary Examiner—Malcolm F. Hubler
Attorney—Edward J. Norton

[57] ABSTRACT

The disclosure is directed to a technique for discriminatingly extracting a subset of meaningful information signals from a babble of similar signals and then utilizing only the information contained in this subset. This technique is particularly suitable for use in an air collision avoidance system consisting of a plurality of essentially asynchronous interrogator-responder and transponder stations all of which utilize the same relatively long preselected pseudo-random code to provide the desired discrimination by correlation techniques.

24 Claims, 11 Drawing Figures

CRAFT INTERROGATOR RESPONDER STATION

INVENTOR
JACK BRECKMAN

BY George J. Wigsohn
ATTORNEY

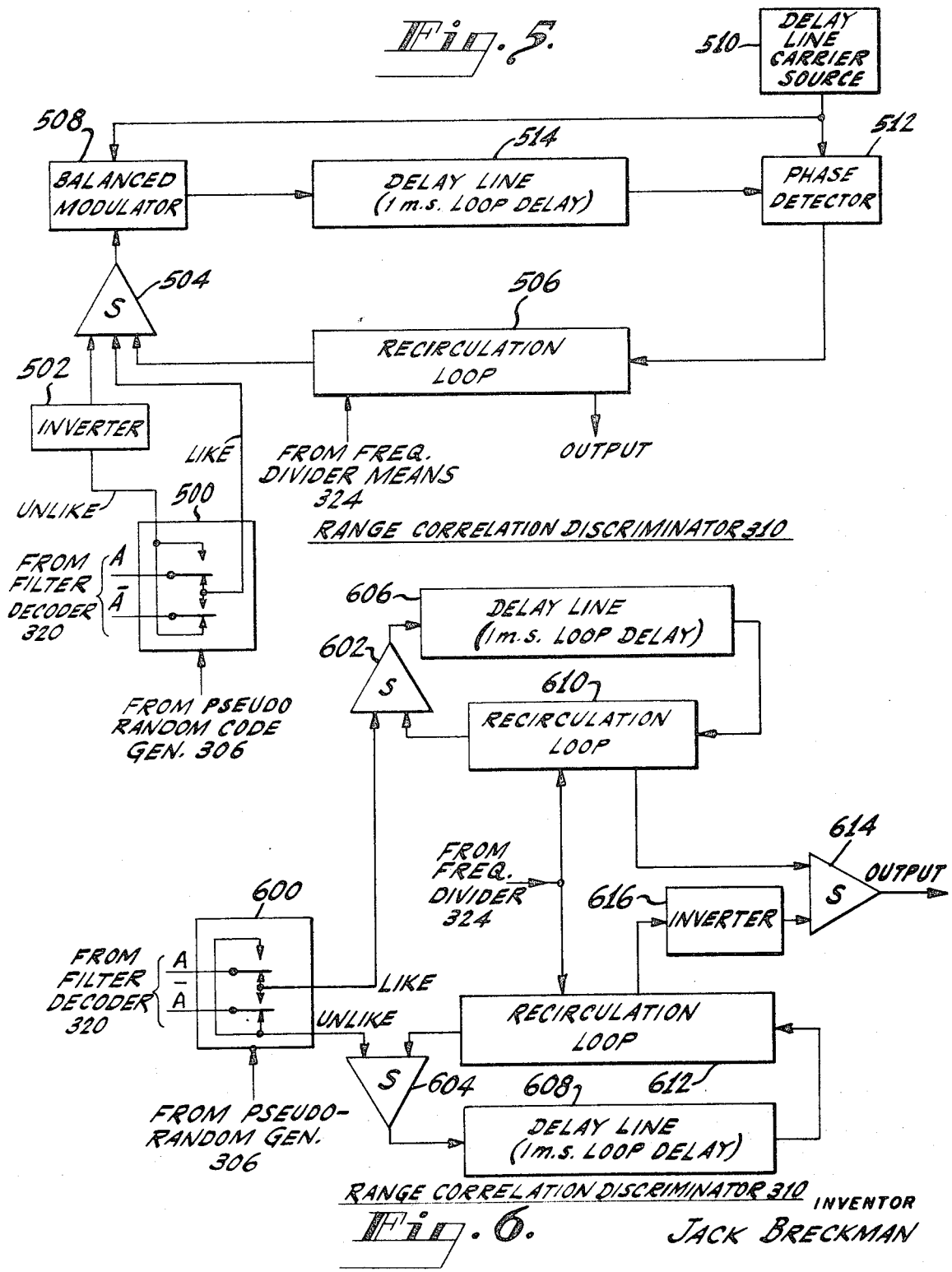

INVENTOR
JACK BRECKMAN

BY George J. Seligsohn
ATTORNEY

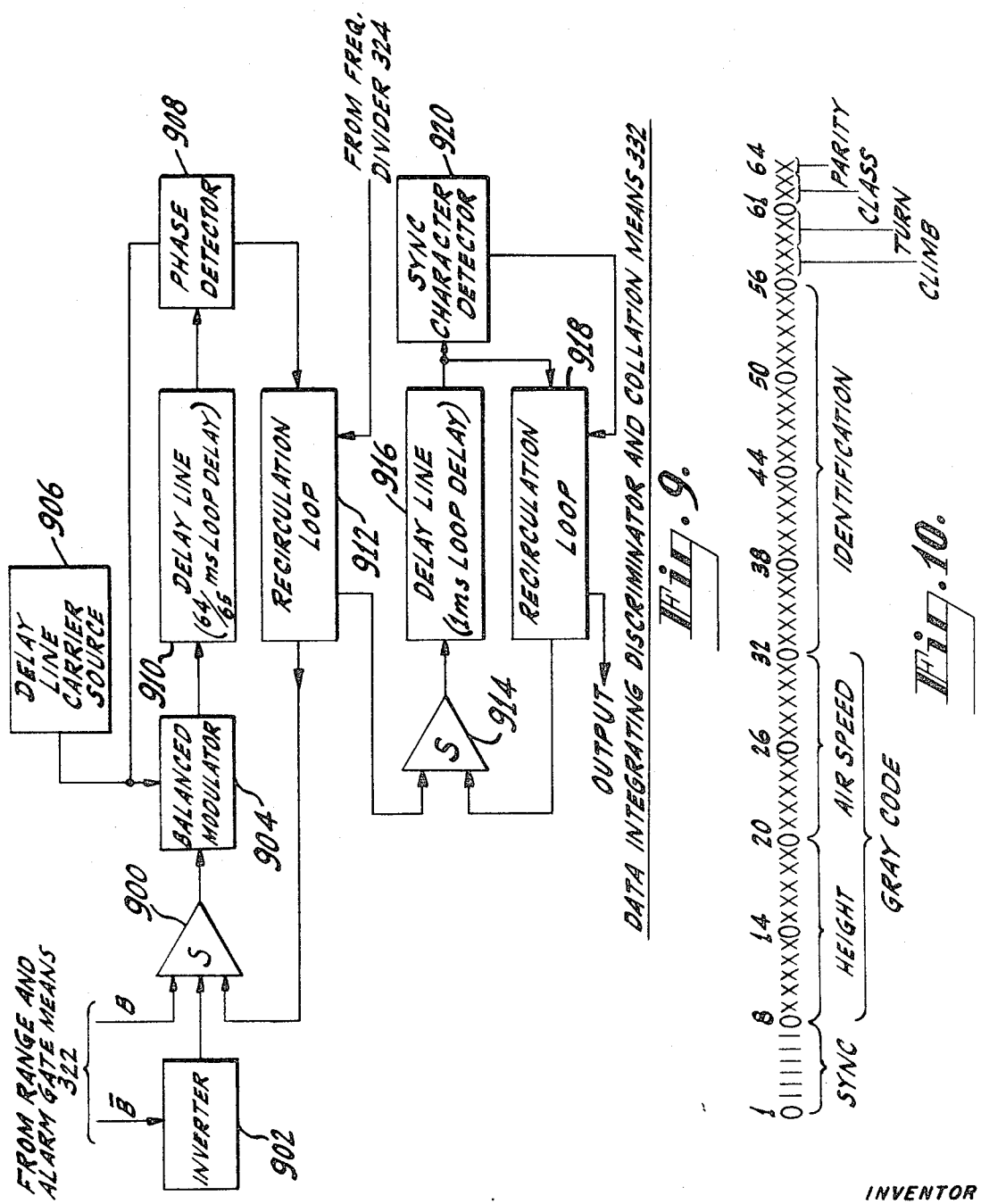

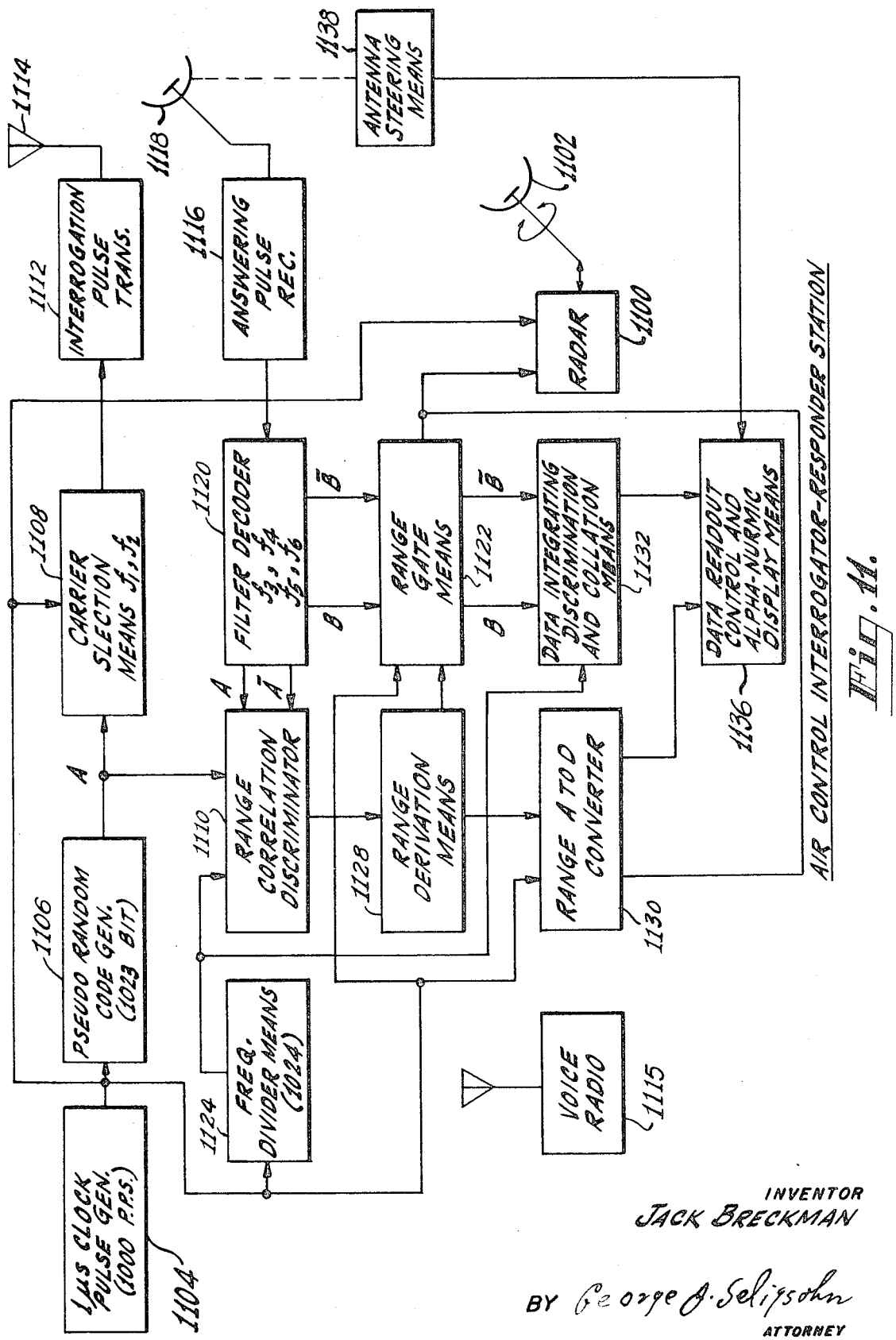

DISCRIMINATING SIGNALING SYSTEM

This invention relates to a discriminating signaling system and, more particularly, to such a system which, although not limited thereto, is particularly suitable for object locating and data communication in a collision avoidance system for aircraft, spacecraft, seacraft or landcraft.

With the continuing increase in all types of aviation in the last several years, and the expected greater increase in the years to come, the need for an effective collision avoidance system for aircraft has become most pressing. Therefore, for illustrative reasons, the present invention will be described in connection with an aircraft collision avoidance system.

The need for an aircraft collision avoidance system together with one proposed such system is discussed in the article "EROS, An Airborne Collision Avoidance System", by Joseph H. Wujeck, Jr., appearing on pages 35–38, and 90 of the December 1967 issue of *Electronics World*, published by Ziff-Davis Publishing Company. Briefly, the EROS, or Eliminate Range zero (0) System, is a time division multiplex system in which a repetitive time frame of 2 seconds duration is divided up into 1,000 successive time slots each of 2 milliseconds duration. The first time slot of each time frame is assigned to a master station on the ground which supplies extremely accurate time synchronization to each of a cluster of up to 999 separate aircraft. Each separate aircraft of the cluster is assigned its own individual time slot, which is different for each separate aircraft of the cluster. Each aircraft of the cluster transmits to the master station and to all the other aircraft of the cluster only during a portion of its own time slot and is in a receive condition at all other times. The master station on the ground, besides transmitting during its own first time slot of each time frame to provide coarse synchronization for the aircraft of the cluster, provides fine synchronization information for each separate aircraft of the cluster during the latter portion of the time slot assigned to that aircraft. All the aircraft of the cluster, as well as the master ground station, transmit and receive at the same predetermined frequency.

From the foregoing, it is clear that the proposed EROS air collision avoidance system requires very accurate time synchronization for its proper operation. This requirement results in the needed equipment aboard each aircraft costing between $30,000 and $50,000. While such a cost is quite reasonable for a commercial airline aircraft or a military aircraft, it is much too high for most general aviation aircraft. Since the number of general aviation aircraft is far greater than all of the commercial airline aircraft and the military aircraft together, the cost per unit should be low enough not to preclude most general aviation aircraft from being part of an air collision avoidance system.

The present invention is directed to a novel technique which requires neither time division multiplexing nor accurate system wide time synchronization, for discriminatingly extracting a subset of meaningful information signals received at a predetermined frequency or frequencies from a babble of similar signals all received at the same predetermined frequency or frequencies, and then analyzing and utilizing only the information signals contained in this subset. The received information signals may manifest in coded form information as to aircraft identity, as well as information as to velocity, altitude, etc. Further, although the present invention may be embodied in relatively costly sophisticated equipment for use in commercial airliners or military aircraft, it also may be embodied in relatively inexpensive ($2,000 or less) simple equipment for use in general aviation aircraft.

The system of the present invention consists of a plurality of separate essentially asynchronous stations. Each aircraft forming part of the system is provided with a separate station. In certain embodiments of the invention, additional separate stations are located at air control towers of air terminals and/or aboard one or more satellites in predetermined orbit. In any case, each and every station of the system utilizes a relatively long certain single pre-selected pseudo-random code, which is the same for all stations, to control its operation within the system. The present invention makes use of the fact that a maximum-length, pseudo-random code exhibits a very high degree of auto-correlation, but exhibits a very low degree of cross-correlation with respect to separate asynchronous sources, such as the separate stations of the system disclosed herein.

It is therefore an object of the present invention to provide an improved discriminating object-locating communication system.

It is a more specific object of the present invention to provide such a system which is particularly suitable for use in air collision avoidance.

In accordance with one feature of the present invention, any aircraft of the system may be provided with means for transmitting repetitively a series of interrogating pulses, each successive pulse of which is characterized in accordance with a preselected pseudo-random code. Each aircraft of the system may further include a transponder responsive to the characteristic of each interrogating pulse received thereby for transmitting a series of answering pulses, each of which is therefore also characterized by the same pre-selected pseudo-random code. Any aircraft of the system also may be supplied with means for receiving the answering pulses transmitted by other aircraft, regardless of whether these answering pulses were derived in response to interrogating pulses transmitted from that aircraft or were derived in response to interrogating pulses transmitted by other aircraft. However, a high degree of correlation will only exist between those answering pulses received by any aircraft which were derived in response to interrogating pulses from that particular aircraft. This is due to the essential asynchronous relationship of the interrogating pulses respectively transmitted from the separate aircraft of the system and to the maximum-length pseudo-random code employed. Suitable correlation detector means aboard an aircraft, to be described in detail below, makes it possible to extract from all answering pulses received by that aircraft only those answering pulses from other aircraft which were derived in response to interrogating pulses from that aircraft. In addition, means responsive to the output of the correlation detector means may be provided aboard any one of the aircrafts for selectively analyzing those received answering pulses originating, respectively, from different other aircraft of the system in response to interrogating pulses transmitted from that one of the aircrafts.

In accordance with another feature of the present invention, the aforesaid answering pulses, besides being characterized by the long certain preselected pseudo-random code, may also be characterized by a data communication code which is independent of the pseudo-random code. The data communication code, unlike the psuedo-random code, may be different for separate aircrafts of the system and is capable of communicating from an aircraft of the system some or all of such information as its identity, altitude, velocity, etc., to other stations of the system.

In accordance with still another feature of the present invention, interrogating pulses characterized by the aforesaid pseudo-random code may be transmitted solely by a master station, such as a station located at an air control tower of an air terminal or aboard a satellite, rather than by each aircraft of the system. However, in this case, aircraft of the system may incorporate means for receiving, monitoring and analyzing the answering pulses transmitted from other aircraft in response to interrogating pulses from the master station. In order to accomplish this, an aircraft of the system utilizes the receipt by itself of interrogating pulses from the master station to establish for itself solely for its own use an effective time zero for the start of each of the repetitive pseudo-random code time periods which can be employed to reference the time of receipt of answering pulses transmitted from other aircraft of the system.

Other objects, features and advantages of the present invention will become more apparent from the following detailed description taken together with the accompanying drawings in which:

FIG. 5 is a block diagram of one embodiment of the range correlation discriminator shown in FIG. 3;

FIG. 6 is an alternative embodiment of the range-correlation discriminator shown in FIG. 3;

FIG. 9 is a block diagram of the data interrogating discriminator and correlation means shown in FIG. 3;

FIG. 10 illustrates the format of a typical data code utilized in the present invention; and FIG. 11 is a block diagram of an air control interrogator-responder station on the ground.

Figure 1:
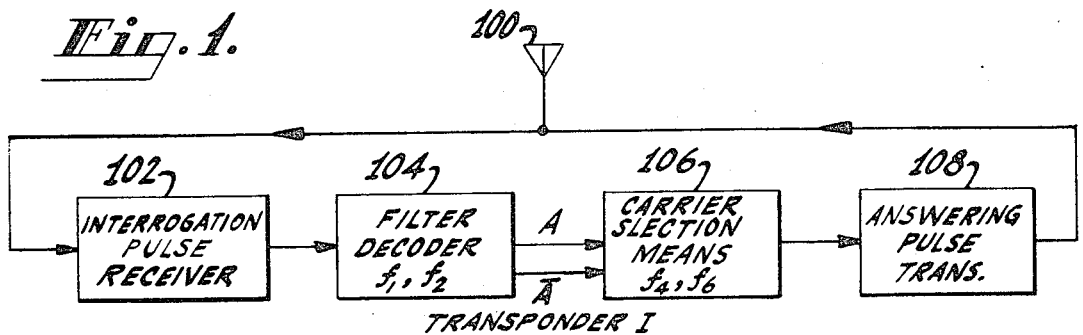
FIG. 1 is a block diagram of the simplest transponder aboard any craft which is capable of contributing to, but not fully participating in, the overall system.

Referring now to FIG. 1, there is shown a block diagram of transponder I, the simplest transponder which may be utilized with the present invention. In response to an interrogation signal, which may be a burst of carrier frequency of either a first frequency or a second frequency, being intercepted by antenna 100 and being applied as an input to interrogation pulse receiver 102, the output of interrogation pulse receiver 102 is a frequency $f_1$ when the first frequency is being received by receiver 102 and is frequency $f_2$ when the second frequency is being received by receiver 102. Interrogation pulse receiver 102 includes signal amplifiers and may include a frequency down-converter.

The output of interrogation pulse receiver 102 is applied to filter decoder 104, which includes a first filter tuned to frequency $f_1$ which produces a first output, A, in response to the output from interrogation pulse receiver 102 being frequency $f_1$, and a second filter tuned to frequency $f_2$ which produces a second output, $\overline{A}$, in response to the output from interrogation pulse receiver 102 being frequency $f_2$.

The respective outputs A and $\overline{A}$ are applied as first and second inputs to carrier selection means 106. Carrier selection means 106 may include two separate oscillators or it may include a frequency synthesizer. In any case, in response to the input A being applied thereto carrier selection means 106 applies to the output thereof frequency $f_4$ and in response to the input $\overline{A}$ being applied thereto carrier selection means 106 applies to the output thereof frequency $f_6$. It will thus be seen that in response to a burst of first frequency being intercepted by antenna 100, carrier selection means 106 will apply a burst of frequency $f_4$ to the output thereof, while in response to a burst of second frequency being intercepted by antenna 100, carrier selection means 106 will apply a burst of frequency $f_6$ to the output thereof. Answering pulse transmitter 108 includes signal amplifiers and may include a frequency up-converter for producing an output at two different frequencies corresponding respectively to either frequency $f_4$ or $f_6$, as the case may be. The output from answering pulse transmitter 108 is applied to antenna 100 and is radiated therefrom.

Figure 2:
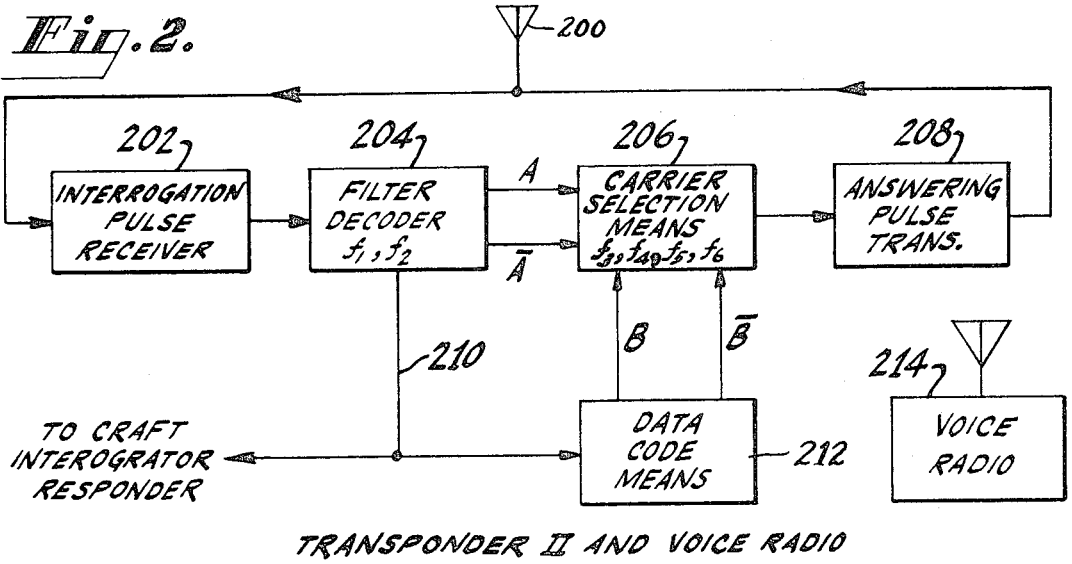
FIG. 2 is a block diagram of a type of transponder and a voice radio aboard a craft which makes it possible for that craft to participate in the benefits of the overall system.

Referring now to FIG. 2, there is shown a block diagram of transponder II, which is somewhat more complex than transponder I shown in FIG. 1. Antenna 200, interrogation pulse receiver 202 and answering pulse transmitter 208 are identical in structure and function to the corresponding elements 100, 102 and 108 of transponder I. However filter decoder 204 of transponder II, in addition to producing separate outputs A and $\overline{A}$, as does filter decoder 104 of transponder I, also includes appropriate OR gates for producing an output pulse on conductor 210 both in response to a burst of frequency $f_1$ being applied to filter decoder 204 and also in response to a burst of frequency $f_2$ being applied to filter decoder 204.

In addition, transponder II includes data code means 212. Data code means 212 comprises means for obtaining certain data in binary form and sequentially reading this information out a bit at a time in accordance with a predetermined format under the control of the successive pulses appearing on conductor 210. A typical predetermined format for the binary data code is shown in FIG. 10.

As shown, the binary data code may be composed of 64 bits, of which the 1, 8, 14, 20, 26, 32, 38, 44, 50, 56, and 61 ordinally numbered bits are permanently binary "zeroes". In addition, the group comprising the 2–7 ordinally numbered bits are permanently binary "ones". The binary value of the remainder of the 64 bits may be utilized to transmit information as to any part or all of such pertinent variables as the height, air speed, and identification of the aircraft on which the transponder II is located, as well as information pertaining to climb and turn of the aircraft, and/of the class of aircraft. Further, the data code may include a code checking parity bit.

As far as data code means 212 of transponder II is concerned, it will be seen that means 212 may include appropriate sensing means for determining such data such as height and air speed along with analog to digital converters for presenting this information in binary form. In addition, data code means 212 includes appropriate pre-wiring to provide the permanent valued binary bits as well as information about its identification. Of course not all the information shown in the data code of FIG. 10 must be provided by the data code means of a transponder II. For instance, some general aircraft, while desiring to provide a better transponder than transponder I, may merely be desirous of transmitting information as to the craft's identification and code checking parity, for instance, without providing the gear necessary to provide the rest of the variable information shown in the data code of FIG. 10. In this case bits 9-13, 15-19, 21-25, 33-37, 57-60 and 62 and 63 of the data code means of the transponder of such a craft would be pre-wired as binary "zeros".

Data code means 212 also includes a cyclically operated read out steering means for reading out in order the binary value of an individual successive bit of the binary data code in response to each respective pulse applied to data code means 212 from conductor 210. Those bits which manifest a binary value "one" will produce an output from data code means 212 on conductor B and those bits which manifest a binary value "zero" will produce an output from data code means 212 on conductor $\bar{B}$.

Thus, carrier selection means 206 has outputs A and $\bar{A}$, respectively, from filter decoder 204 and outputs B and $\bar{B}$, respectively, from data code means 212 applied as inputs thereto. Carrier selection means 206 includes either four oscillators or a frequency synthesizer for generating frequencies $f_3$, $f_4$, $f_5$ and $f_6$. In addition, carrier selection means 206 includes a logic circuit for either controlling oscillator gates or the frequency produced by the frequency synthesizer, as the case may be, in accordance with the binary values manifested by the inputs thereto. More specifically, carrier selection means 206 supplies a carrier frequency $f_3$ to the output thereof in response to respective signals being present on its A and B inputs; supplies a carrier frequency $f_4$ to the output thereof in response to respective signals being present on its A and $\bar{B}$ inputs; supplies a carrier frequency $f_5$ to the output thereof in response to respective signals being present on its $\bar{A}$ and B inputs; and supplies a carrier frequency $f_6$ to the output thereof in response to respective signals being present on its $\bar{A}$ and $\bar{B}$ inputs. After amplification and possible frequency up-conversion in answering pulse transmitter 208, a burst having one of four different frequencies corresponding respectively to frequencies $f_3$, $f_4$, $f_5$ or $f_6$ is radiated by antenna 200 of transponder II.

Also shown in FIG. 2 is voice radio 214. The purpose of voice radio 214 will be described later.

Figure 3:
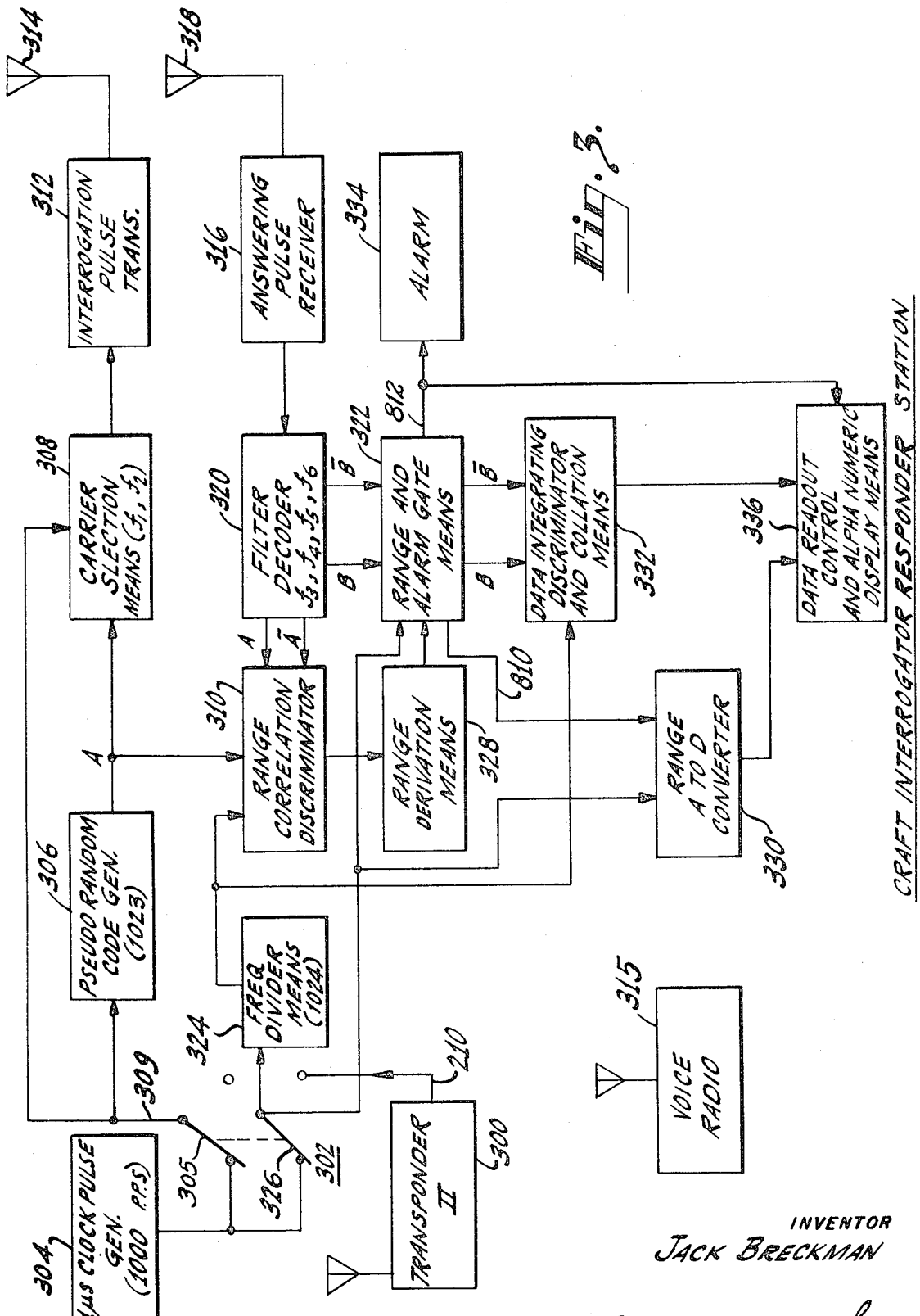
FIG. 3 is a block diagram of a craft interrogator-responder station.

Referring now to FIG. 3 there is shown in block diagram form the equipment present on a fully equipped aircraft of the system. This equipment includes transponder II 300 and voice radio 315, which are identical in structure and function to the transponder II and the voice radio 214, shown in FIG. 2. Further, the signal present on conductor 210 of the transponder II is applied, as shown, to the lower right hand pole of a two-pole two-throw switch 302.

Further shown in FIG. 3 is a clock pulse generator 304, which periodically generates pulses having a width of 1 microsecond at a pulse repetition rate of 1,000 pulses per second. Therefore, the period between successive pulses from clock pulse generator 304 is 1 millisecond. The output of clock pulse generator 304 is connected as shown to both the upper and lower left hand poles of switch 302. The signal present on upper switch contact 305 of switch 302 is applied as shown as an input to pseudo-random code generator 306 and as a first input to carrier selection means 308 over conductor 309.

Figure 4:
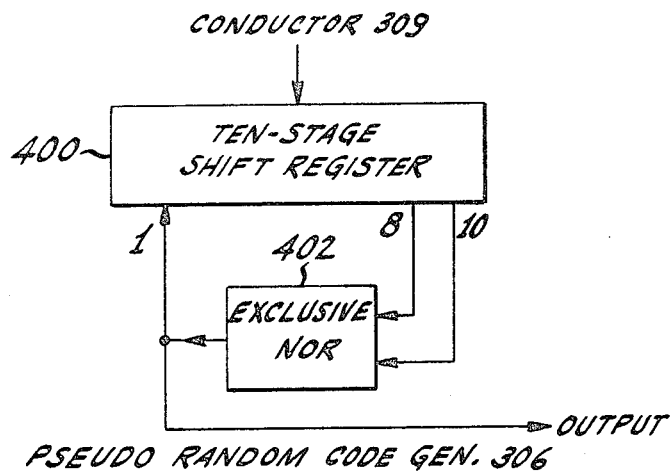
FIG. 4 is a block diagram of the pseudo-random code generator shown in FIG. 3.

Pseudo-random code generator 306 is shown in detail in FIG. 4. Pseudo-random code generator 306 comprises 10-stage shift register 400 which has its stages 8 and 10 connected respectively as inputs to exlusive NOR logic means 402. The output from exclusive NOR logic means 402 is applied as an input to stage one of 10-stage shift register 400. In addition, the binary value of stage one of register 400 is the output from pseudo-random code generator 306. Shift register 400 is shifted in response to the clock pulses applied thereto over conductor 309. Exclusive NOR logic means 402 is effective in producing an output manifesting the binary value "zero" in response to the binary values manifested by the inputs thereto both being either "one" or "zero", and an output manifesting the binary value "one" in response to the binary value manifested by either of the inputs thereto being "one" and the other being "zero".

So long as the initial condition of shift register 400 is such that all 10 stages do not simultaneously manifest the binary value "zero", the shift register will be shifted in turn by each successive clock pulse to register each respective one of all other possible combinations of binary values that can be manifested with 10 stages, other than the case where all 10 stages simultaneously manifest the binary value "zero"; i.e., ten stage shift register 400 will manifest in turn, in what appears to be a random order but which, in fact, is a predetermined order, $2^{10} - 1$ or 1,023 different binary values, after which the cycle will be repeated. Therefore, there will be a repetitive sequence of 1,023 bits, which 1,023 bits occur in a certain predetermined order and form one cycle of a pseudo-random code.

Since the generation of pseudo-random codes is old in the art, the above general discussion thereof is considered to be sufficient for the purposes of the present invention. Further, it will be seen that by utilizing an 11-stage shift register a pseudo-random code of 2,047 bits can be generated, while by utilizing a nine-stage shift register code of only 511 bits can be generated. For the purposes of the present invention, any predetermined code may be utilized so long as it contains a sufficient number of bits, which preferably should be at least several hundred bits, with about one or two thousand bits being optimum. This is true because it is not desirable to have too long a time period between successive code cycles. The utility of the pseudo-random coce in the present invention will become apparent hereinafter in the specification.

Referring back to FIG. 3, the output from pseudo-random code generator 306 is applied as a first input to range correlation discriminator 310 and as a second input to carrier selection means 308. Carrier selection means 308 includes either first or second oscillators or a frequency synthesizer for generating frequencies $f_1$ and $f_2$. Carrier selection means 308 also includes appropriate logic means responsive to the then present binary value manifested by the second input thereto from pseudo-random code generator 306 for selectively applying either a burst of frequency $f_1$ or $f_2$, as the case may be, to the output of carrier selection means 308 solely during the presence of a clock pulse from clock pulse generator 304 applied as a first input thereto.

The output from carrier selection means 308 is applied as an input to interrogation pulse transmitter 312, which includes signal amplifiers and may include a frequency up-converter for generating the first and second frequencies, discussed above, receivable by the interrogation pulse receivers of the transponders of other craft. In any case, the first frequency, which is generated in response to frequency $f_1$, or the second frequency which is generated in response to frequency $f_2$, is radiated from interrogation pulse transmitter 312 by antenna 314.

Answering pulse receiver 316 is capable or receiving any of the signals which may be transmitted from the answering pulse transmitter of the transponder of other craft and which are intercepted by antenna 318. Answering pulse receiver 316 includes signal amplifiers and may include a frequency down-converter for deriving at its output bursts of frequency $f_3, f_4, f_5$ or $f_6$, in accordance with the particular signal then being received by answering pulse receiver 316.

The output from answering pulse receiver 316 is applied as an input to filter decoder 320. Filter decoder 320 includes separate filters tuned to each of frequencies $f_3, f_4, f_5$ and $f_6$ and, in addition, includes logic means responsive to the receipt of a burst of frequency $f_3$ for simultaneously applying a pulse to the A and to the B output conductors thereof; responsive to the receipt of burst of frequency $f_4$ for simultaneously applying a pulse to the A and to the $\bar{B}$ output conductors thereof; responsive to the receipt of a burst of frequency $f_5$ for simultaneously applying a pulse to the $\bar{A}$ and to the B output conductors thereof; and responsive to the receipt of a burst of frequency $f_6$ for simultaneously applying a pulse to the $\bar{A}$ and to the $\bar{B}$ output conductors thereof. The A and $\bar{A}$ outputs of filter decoder 320 are applied respectively as second and third inputs to range correlation discriminator 310 and the B and $\bar{B}$ outputs of filter decoder 320 are applied respectively as first and second inputs to range and alarm gate means 322.

Range correlation discriminator has the output of frequency divider means 324 applied as a fourth input thereto. Frequency divider means 324, which has its input selectively coupled to either clock pulse generator 304 or to transponder II output conductor 210 through lower switch contact 326 of switch 302, produces a single output pulse therefrom in response to the receipt of $2^{10}$ or 1,024 consecutive pulses applied as an input thereto.

Range correlation discriminator 310 will now be described. Range correlation discriminator 310 is any device capable of deriving an output signal substantially in accordance with the following correlation function:

(1) $$S_0 = C \sum_1^n [(S_3 - S_4)A + (S_4 - S_3)\bar{A}]$$

where A is any bit period of pseudo-random code generator 306 manifesting a certain binary value, $\bar{A}$ is any bit period of pseudo-random code generator 306 manifesting a binary value opposite to this certain binary value, C is a constant of proportionality, $S_3$ is the instantaneous value of the A output of filter decoder 320 at some certain time after the beginning of each successive bit period, $S_4$ is the instantaneous value of the $\bar{A}$ output of filter decoder 320 at the same certain time after the beginning of each successive bit period, $n$ is a certain integral number of successive bit periods, and $S_0$ is the instantaneous value of the output signal corresponding to the aforesaid certain time after the beginning of each successive bit period.

One embodiment that range correlation discriminator 310 may take is shown in FIG. 5. Referring to FIG. 5, switch means 500, shown schematically and which in practice would be an electronic switch, is controlled in accordance with the binary value of the signal present on the input thereto from pseudo-random code generator 306. More particularly, when this signal manifests the binary value "one" the A input from filter decoder 320 is selectively coupled to the "like" output conductor of switching means 500, while the $\bar{A}$ input from filter decoder 320 is selectively coupled to the "unlike" output conductor of switch means 500; i.e., the switches of switch means 500 are effectively connected to the lower contacts thereof, as shown schematically in FIG. 5. When the signals present on the input from pseudo-random code generator 306 manifests the binary value zero the switches of switch means 500 are controlled thereby to be effectively connected to the upper contacts thereof. In this case, the A input from filter decoder 320 will be coupled to the unlike output conductor of switch means 500, while the A input from filter decoder 320 will be coupled to like output conductor of switch means 500.

The unlike output of switch means 500, after being inverted by invertor 502, is applied as a first input to summing amplifier 504. The like output of switch means 500 is applied directly as a second input to summing amplifier 504. A third input to summing amplifier 504, which will be discussed in more detail below, is obtained from a first output of recirculation loop 506.

The output of summing amplifier 504 is applied as a first input to balanced modulator 508. A delay line carrier source 510, which generates an appropriate carrier frequency such as 30 MHz, for instance, is applied as a second input to balanced modulator 508 and is also applied as a first input to phase detector 512. Balanced modulator 508 provides this carrier frequency at its output with a certain phase in response to the polarity of the first input to balanced modulator from summing amplifier 504 having a reference polarity the same as the like output directly applied as the second input to summing amplifier 504, and with a phase 180° reversed with respect to this certain phase in response to the polarity of the first input to balanced modulator from summing amplifier 504 having a polarity opposite to this reference polarity, i.e., the polarity of the output from inverter 502 applied as the first input to summing amplifier 504.

The output from balanced modulator 508 is applied as an input to delay line 514 and the output from delay line 514 is applied as a second input to phase detector 512. Phase detector 512 may include a synchronous detector along with means for introducing a required fixed phase shift of one of the two inputs applied thereto to ensure that the demodulated output therefrom has the aforesaid reference polarity when the signal applied as a second input to phase detector 512 from delay line 514 manifests the aforesaid certain phase, and has a polarity opposite to the aforesaid reference polarity when the signal applied as a second input to phase detector 512 from delay line 514 manifests the aforesaid 180° phase-reversed phase. The output from phase detector 512 is applied as an input to recirculation loop 506. Recirculation loop 506 includes normally open gates which forward the input thereto to the first output therefrom which, as discussed above, is applied as a third input to summing amplifier 504.

The total loop delay, which is mostly composed of the delay provided by delay line 514 but which also includes any slight inherent delay provided by phase detector 512, recirculation loop 506, summing amplifier 504 and balanced modulator 508, is 1 millisecond, a time just equal to a single bit period, i.e., the time between successive clock pulses. Therefore, any given time after the beginning of any bit period the output from recirculation loop 506, applied as a third input to summing amplifier 504, will manifest the polarity and value of the algebraic sum of the respective values of the signals applied as first and second inputs to summing amplifier 504 at this same given time after the beginning of each preceding bit period starting with a certain intitial bit period. Summing amplifier 504 will then algebraically add to this cumulative third input signal thereto at the aforesaid given time after the beginning of a then existing bit period the input signal, if any, then being applied to either the first input or the second input to summing amplifier 504. In this manner the information applied to the first and second inputs of summing amplifier 504 is integrated and stored in recirculating delay line 514.

Every 1,024 consecutive bit periods a one millisecond pulse which is substantially co-extensive with this 1,024th bit period is applied as a second input to recirculation loop 506 from frequency divider means 324. In response to this second input, the normally opened gates forwarding the first input to recirculation loop 506 to the first output thereof, discussed above, are closed and other normally closed gates therein are opened to forward the first input to recirculation loop 506 to the second output thereof, which constitutes the output of range correlation discriminator 310. Thus, all the integrated information stored in delay line 514 during the preceding 1,024 milliseconds is read out of delay line 514. The process is then repeated.

The need for a delay line carrier frequency in FIG. 5 is to make possible the storage of respective bits manifesting either positive polarity or negative polarity. The reason that the output of delay line 514 is demodulated after each recirculation cycle and then re-modulated, rather than demodulating only after read out of the information in the delay line at the end of 1,024 milliseconds, is to minimize the required tolerance of phase coherence of delay line carrier source 510. This permits the use of a much less expensive and much less precise oscillator for generating the delay line carrier frequency than would otherwise be the case.

It will be noted that there are only 1,023 bit periods in each cycle of the pseudo-random code provided by generator 306, while frequency divider means 324 provides readout of the information in delay line 514 after each 1,024 bit periods. The reason for this is merely to simplify the required structure, since it is simpler to build a frequency divider of $2^{10}$ than $(2^{10}-1)$, while it is simpler to build a pseudo-random code generator providing $2^{10}-1$ bits, rather than $2^{10}$ bits. The only effect of these numbers having the values 1,023 and 1,024, respectively, is that delay line 514 will store one more bit period than a full pseudo-random code cycle before being read out, so that each readout cycle of delay line 514 will commence with a different bit position of the pseudo-random code. However, this does no harm. The only requirement is that delay line 514 store a sufficient number of bit periods to provide a sufficiently high statistical correlation between like inputs to switch means 500 and a sufficiently low statistical correlation between unlike inputs to switch means 500. An interval between successive readouts of delay line 514 equal to several hundred milliseconds will give reasonably good correlation. However, for optimum correlation, the interval between consecutive readouts of delay line 514 should be a multiple of the pseudo-random code of 1,023 bits and yet provide reasonably frequent readouts of information from delay line 514.

By algebraic manipulation the correlation function set forth above in Equation 1 may be expressed in the following form:

$$(2) \quad S_0 = C\left[\sum_1^n (S_3 A + S_4 \bar{A}) - \sum_1^n (S_4 A + S_3 \bar{A})\right].$$

An alternative embodiment that range correlation discriminator 310 may take, which solves the correlation function in the form given in Equation 2, is shown in FIG. 6.

Referring to FIG. 6, switch means 600 is in all respects identical in structure and function to switch means 500 of FIG. 5. However, the like output of switch means 600 is applied as a first input to first summing amplifier 602, while the unlike output of switch means 600 is applied as a first input to second summing amplifier 604. The output of first summing amplifier 602 is applied as an input to first delay line 606 and the output of second summing amplifier 604 is applied as an input to second delay line 608. The output of first delay line 606 is applied through first recirculation loop 610, which is equivalent in structure and function to recirculation loop 506 of FIG. 5, to provide a first output therefrom which is applied as a second input to summing amplifier 602. The output of second delay line 608 is applied through second recirculation loop 612, which is equivalent in structure and function to recirculation loop 506 of FIG. 5, to provide a first output therefrom which is applied as a second input to summing amplifier 604. The total loop delay of each of the respective recirculating delay lines is 1 millisecond.

In response to a readout pulse from frequency divider means 324, which is applied as a second input to recirculation loop 610 and recirculation loop 612, the information stored in delay line 606 is read out as a second output from recirculation loop 610 and is applied directly as a first input to third summing amplifier 614, and information stored in delay line 608 is read out as a second output from recirculation loop 612 and is applied through inverter 616 as a second input to third summing amplifier 614. The output from third summing amplifier 614 constitutes the output from range correlation discriminator 310.

It will be noted that in the embodiment of the range correlation discriminator shown in FIG. 6 it is not necessary to utilize a carrier frequency, since the polarity of the signal stored in either delay line 606 or delay line 608 is not a variable, as in FIG. 5. However, the embodiment of range correlation discriminator 310 shown in FIG. 6 requires two separate recirculating delay lines, while the embodiment of range correlation discriminator shown in FIG. 5 requires only a single recirculating delay line. However, the output signal obtained from range correlation discriminator 310 is the same in all respects regardless of whether the FIG. 5 or FIG. 6 embodiment of discriminator 310 is used.

Although a recirculating delay line is utilized as the storage and integrating means in both FIGS. 5 and 6, other types of storage and integrating means, such as storage cathode ray tubes, may be substituted therefor. For instance, in the case of FIG. 6, a like storage tube may be substituted for delay line 606 and an unlike storage tube may be substituted for delay line 608. Each of these tubes could be provided with a 200-line scan frame composed of two interlaced 100-line scan fields. Each scan line could have a duration of 10 microseconds, so that each of the two interlaced 100-line scan fields would have a duration of 1 millisecond, the bit period between successive clock pulses. Thus while one of the interlaced scan fields is being written into the storage tube, the other interlaced scan field, which was written in during the preceding bit period, can be simultaneously read out, recirculated and combined with the presently existing information in a summing amplifier, such as summing amplifier 602 or 604. Thus, the information applied as an input to such a storage tube during all preceding bit periods, starting with the previous reading out of the stored information therein upon the opening of the recirculation loop, can be cumulatively integrated and stored therein over each successive bit period until the next time the recirculation loop is opened.

Figure 7:
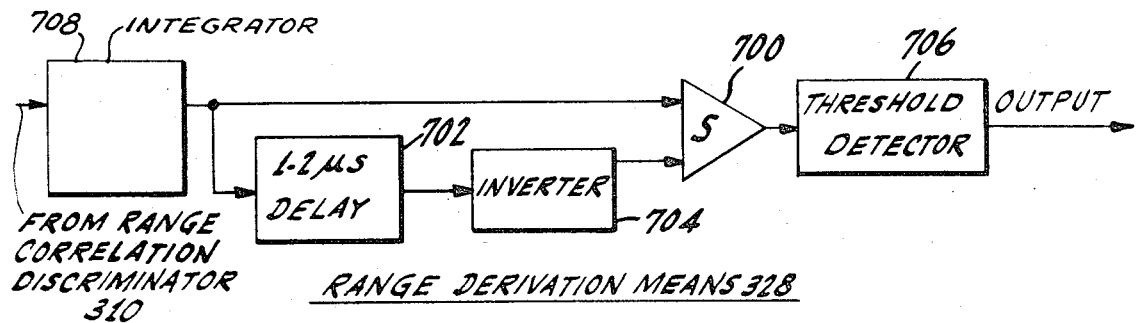
FIG. 7 is a block diagram of the range derivation means shown in FIG. 3.

Referring back to FIG. 3, the output from range correlation discriminator 310 is applied as an input to range derivation means 328, which may take the form shown in FIG. 7. As shown in FIG. 7, the output from range correlation discriminator is applied to integrator 708, whose output is applied directly as a first input to summing amplifier 700 and is applied through delay means 702, which provides a delay of between 1 and 2 microseconds, and through inverter 704 as a second input to summing amplifier 700. It will be seen that the second input applied to summing amplifier 700 is identical to the first input applied thereto, except that it is inverted in polarity and is slightly delayed in time by 1 to 2 microseconds, where the width of a clock pulse, and hence the width of an interrogation pulse and an answering pulse, is 1 microsecond. This will result in the output from summing amplifier 700 being a moving "window" which will produce an output level proportional to the area within the window. The output from summing amplifier 700 is applied as an input to threshold detector 706 which produces an output therefrom only in response to the input applied thereto from summing amplifier 700 having a given polarity and greater than a predetermined amplitude. The output from threshold detector 706 constitutes the output from range derivation means 328.

The embodiment of range derivation means shown in FIG. 7 has the advantage of passing only relatively sharp and relatively large changes in the amplitude of the output signal obtained from range correlation discriminator 310, so that spurious noise signals and other spurious variations in the amplitude of the output from range correlation discriminator 310 are not passed. Thus, a very clean output is obtained from range derivation means 328.

As shown in FIG. 3, the output from range derivation means 328 is applied as a third input to range and alarm gate means 322. Range and alarm gate means 322 also has first and second inputs from filter decoder 320, previously discussed, applied thereto, as well as a fourth input selectively applied thereto from either clock pulse generator 304 or conductor 210 of transponder II 300 through lower switch contact 326 of switch 302. Range and alarm gate means 322 is shown in detail in FIG. 8.

Figure 8:
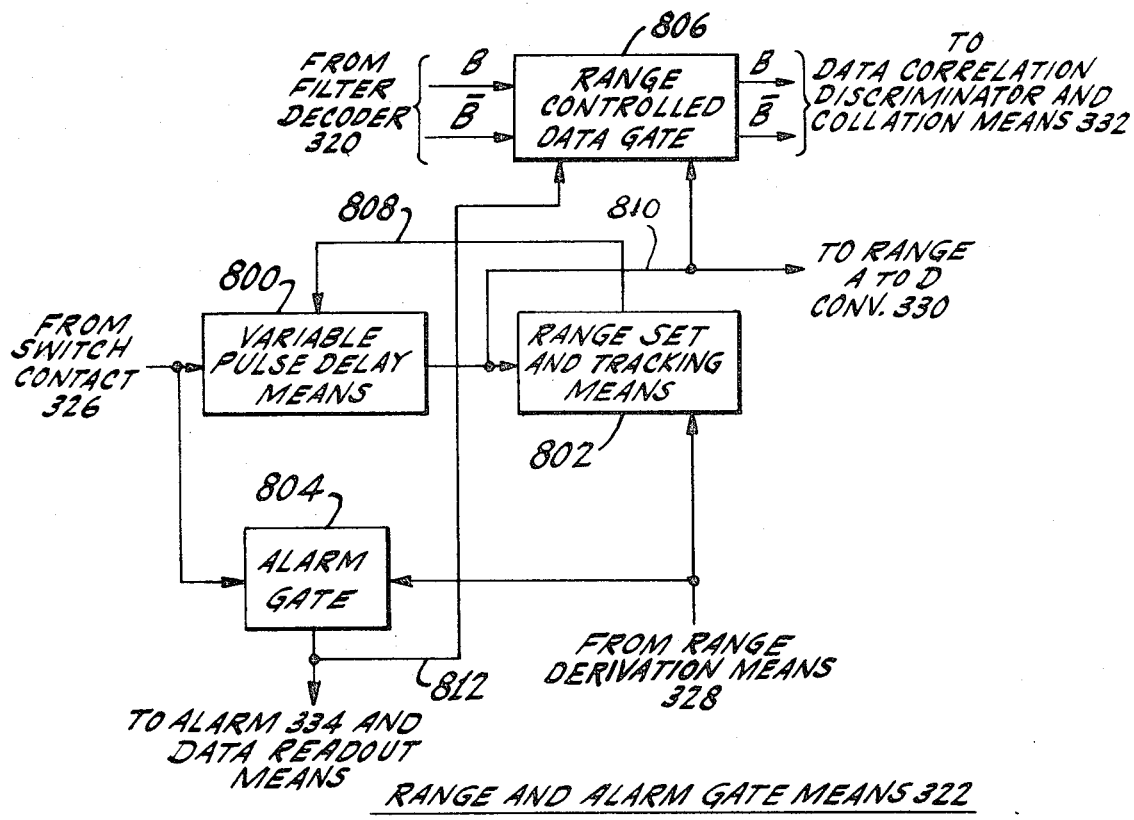
FIG. 8 is a block diagram of the range and alarm gate means shown in FIG. 3.

Referring now to FIG. 8, range and alarm gate means 322 comprises variable pulse delay means 800, range set and tracking means 802, alarm gate 804 and range-controlled data gate 806. The first and second inputs to range and alarm gate means 322 from filter decoder 320 are applied, respectively, as first and second inputs to range-controlled data gate 806, which is a normally closed gate. The third input to range and alarm gate means 322 from range derivation means 328 is applied respectively as a first input to range set and tracking means 802 and as a first input to alarm gate 804. The fourth input to range and alarm gate means 322, which consists of periodic pulses selectively applied from either clock pulse generator 304 or transponder II 300 through lower switch contact 326 of switch 302, is applied respectively as a first input to variable pulse delay means 800 and as a second input to alarm gate 804.

Variable pulse delay means 800, produces an output pulse therefrom a variable selected time after the application of an input pulse thereto. This variable selected time is controlled in accordance with a voltage applied as a second input to variable pulse delay means 800 from range set and tracking means 802 over conductor 808. By way of example, variable pulse delay means 800 may include a voltage controlled monostable variable delay multivibrator which initiates a delay period in response to being triggered by an input pulse thereto, which delay period has a duration determined in accordance with the control voltage applied thereto over conductor 808, and which further includes differentiating means for generating an output pulse at the end of each delay period. Thus, it will be seen that the value of the controlled voltage on conductor 808 and the length of the resulting delay period between the input and the output pulses of variable pulse delay means 800 each manifest some given value of range.

Range set and tracking means 802 makes use of techniques which are well known in connection with distance measuring equipment. Firstly, range set and tracking means 802 may be provided with means, which may be manual, for initially setting the magnitude of the control voltage on output conductor 808 thereof to manifest any given value of range up to a predetermined maximum. In this manner, the output pulse from variable pulse delay means 800, which is applied as a first input to range, set and tracking means 802, may be initially set to occur in time coincidence with that portion of the signal from range derivation means 328, which is applied as a second input to range set and tracking means 802, which was derived from answering pulses transmitted by the transponder of another craft which is located at the aforesaid given range from the craft on which range and alarm gate means 322 is located.

Secondly, range set and tracking means 802 may include tracking means for automatically varying the magnitude of the control voltage on output conductor 808. In particular, range set and tracking means 802 may include gating means controlled by the output pulse from variable pulse delay means 800 applied as a first input thereto for passing only that portion of the signal from range derivation means 328 applied as a second input thereto which occurs in time coincidence therewith. In addition, range set and tracking means 802 may include comparison means for sensing the direction of any change in the range manifested by the passed signal from range derivation means 328 and varying the control voltage on conductor 808 accordingly in order to cause the occurrence of the output pulse from variable pulse delay means 800 to track the range of the craft then under consideration. By way of example, such comparison means may consist of means for deriving first and second sawtooth signals having opposite slopes over the width of each output pulse from variable pulse delay means 800, means for separately sampling each of these two sawtooth signals at the time of occurrence of the passed signal from range derivation means 328, and means for utilizing an error signal proportional to the algebraic difference between these samples to vary the magnitude of the control voltage on conductor 808 in a manner to minimize this error signal. Thus, variable pulse delay means 800 together with range set and tracking means 802 form a closed loop which insures that the time of occurrence of an output pulse from variable pulse delay means 800 accurately manifests the range to a preselected other craft then under consideration.

The output pulse from variable pulse delay means 800 is applied as a third input to range-controlled data gate 806 over conductor 810 and is also applied as a first input to range analog to digital converter 330 shown in FIG. 3, which will be discussed in more detail below. Range-controlled data gate 806 includes normally closed gates for respectively passing a first input B and second input B̄ thereto from filter decoder 320 to first output B and second output B̄ therefrom in response to the opening of these gates. In addition, range controlled data gate 806 includes logic means for normally opening these closed gates in response to the presence of an output pulse from variable pulse delay means 800 on output conductor 810. Therefore, normally the presence of an output pulse on conductor 810, which is indicative of the range to a preselected craft then under consideration, will cause data received from only this preselected craft to be passed to the outputs of range controlled data gate 806, where, as shown in FIG. 3, they are applied as first and second inputs to data integrating discriminator and collation means 332.

Alarm gate 804, which may include a monostable delay multivibrator for opening a normally closed gate for a relatively short duration starting with the application thereto of each second input pulse coupled from switch contact 326. Alarm gate 804 will pass any signal from range derivation means 328 applied as a first input thereto which occurs during the time that alarm gate 804 is open. Since the range manifested during the time that the alarm gate 804 is open is quite small, the presence of a signal from range derivation means 328 during this time is indicative of the fact that another craft is in dangerously close proximity to the craft on which range and alarm gate means 322 is located. In this case, the past signal from alarm gate 804, which is present on alarm gate output conductor 812, is applied to alarm 334 and to data readout control and alphanumeric display means 336, as shown in FIG. 3. In addition, any output signal from alarm gate 804 present on conductor 812 is applied as a fourth input to range-controlled data gate 806.

The effect of the alarm gate output signal on range-controlled data gate 806 is twofold. First, while an output signal from alarm gate 804 is present on conductor 812, the normally closed gates of range-controlled data gate 806 are maintained open to permit the data signals then present on the respective B and B̄ inputs thereto from filter decoder 320 to pass therethrough and be forwarded to data integrating discriminator and collation means 332. Second, the application of a fourth input to range-controlled data gate 806 from alarm gate 804 controls the logic means of range-controlled data gate 806 to render the third input to range-controlled data gate 806 from variable pulse delay means 800 ineffective. Therefore, during any bit period in which an output from alarm gate 804 is applied as a fourth input from range-controlled data gate 806, the gates of range-controlled data gate 806 are opened only in response thereto and are not opened in response to the application of an output pulse from variable pulse delay means to the third input of range-controlled data gate 806.

Referring back to FIG. 3, alarm 334 includes apparatus for providing an audio and/or visual warning in response to a signal from range and alarm gate means 322 over conductor 812 being applied as an input thereto.

Data integrating discriminator and collation means 332 has the gated B and B̄ data signal outputs from range and alarm gate means 322 applied as respective first and second inputs thereto. In addition, the readout pulse output from frequency divider means 324, is applied as a third input to data integrating discriminator and collation means 332. Data integrating discriminator and collation means 332 is shown in detail in FIG. 9. In discussing FIG. 9 it will be assumed that the data code shown in FIG. 10 is being used.

Referring to FIG. 9, the B gated output from range and alarm gate means 322 is applied directly as a first input to summing amplifier 900 and the B̄ gated output from range and alarm gate means 322 is applied directly through inverter 902 as a second input to summing amplifier 900. The output of summing amplifier 900 is applied as a first input to balanced modulator 904, while a delay line carrier frequency, which may be in the order of 30 MHz, is applied from delay line carrier source 906 as a second input to balanced modulator 904. In addition this delay line carrier frequency is applied as a first input to phase detector 908. The output of balanced modulator 904 is applied as an input to delay line 910 and the output of delay line 910 is applied as a second input to phase detector 908. Phase detector 908, which is similar to phase detector 512 described above, produces an output which is applied as a first input to recirculation loop 912. Recirculation loop 912 includes normally open gate means for forwarding the output of phase detector 908 to a first output of recirculation loop 912 and then applying this first output of recirculation loop 912 as a third input to summing amplifier 900.

It will be seen that summing amplifier 900, balanced modulator 904, delay line 910, phase detector 908 and recirculation loop 912 normally form a closed loop. This closed loop has a total loop delay, which mainly consists of the delay provided by delay line 910 but also includes any inherent delays in the other elements of the closed loop, of 64/65 milliseconds.

The first input to summing amplifier 900, directly obtained from the gated B output of range and alarm gate means 322, will have a predetermined polarity, the second input to summing amplifier 900, obtained through inverter 902 from the gated $\overline{B}$ output of range and alarm gate means 322, will have a polarity opposite to this predetermined polarity, and the third input to summing amplifier 900 obtained from recirculation loop 912 may have either the predetermined polarity or a polarity opposite to the predetermined polarity, depending on certain conditions which are discussed in more detail below. In any case, the output from summing amplifier 900 is the algebraic sum of its first, second and third inputs. Therefore, the output from summing amplifier 900 will have both a magnitude and a polarity which depends upon the particular magnitudes and polarities of the respective first, second and third inputs thereto. The output from balanced modulator 904 comprises a carrier frequency with an amplitude which is proportional to the magnitude of the output of summing amplifier 900 and with either a certain phase or a phase 180° reversed with respect to this certain phase depending upon whether the polarity of the output from summing amplifier 900 is positive or negative.

As stated above, the loop delay is 64/65 milliseconds. The reason that this delay is chosen is that the total number of bits comprising one cycle of the data code being used, which as shown in FIG. 10, is 64 bits. As discussed earlier in connection with transponder II in FIG. 2, the data code is cyclically transmitted with successive individual bits thereof being transmitted every millisecond. Since the loop delay is 64/65 milliseconds, a stored preceding bit of the data code will be reinserted into delay line 910 1/65 millisecond prior to the insertion of the next bit in the data code into delay line 910. Therefore, this recirculation will result in a 65:1 compression in the time spacing between successive stored bits of the data code. Since a new cycle of the entire data code is transmitted every 64 milliseconds, the 65th bit received will be the first bit of the next code cycle, the 66th receive bit will be the second bit of the next code cycle, etc. However, the 64/65 millisecond loop delay will result in the 65th received bit, which is received 64 milliseconds after the first received bit, occurring in time coincidence with the recirculating first bit. Thus an integration of corresponding bits of the data code over a plurality of data code cycles will take place.

The output from phase detector 908, which is normally forwarded as a third input to summing amplifier 900 by recirculation loop 912, will have the same polarity as would the output from summing amplifier 900 64/65 milliseconds earlier. This polarity, of course, may be either positive or negative, depending upon the binary value manifested by the integrated bit of the data code with which it corresponds. The integrating portion of data integrating discriminator and collation means 332, just described, provides a high redundancy which greatly reduces the chance of error taking place in the use of the data code.

After $2^{10}$ or 1,024 millisecond bit periods a readout pulse lasting 1 millisecond from frequency divider 324 is applied as a second input to recirculation loop 912. This results in closing the gate between the first input and first output of recirculation loop 912 for this 1 millisecond period, thereby preventing further recirculation of the information stored in the previous 1,024 milliseconds, and simultaneously opening a gate between the first input to recirculation loop 912 and a second output therefrom which is connected as a first input to summing amplifier 914. This results in all the information stored in delay line 910 being read out therefrom and applied as a first input to summing amplifier 914 during the one millisecond bit period in which the readout pulse from frequency divider 324 is applied as a second input to recirculation loop 912.

Summing amplifier 914, delay line 916, and recirculation loop 918, which has its input coupled to the output of delay line 916 and a first output coupled as a second input to summing amplifier 914, normally provides a closed loop having a loop delay of 1 millisecond for recirculating readout information applied thereto from the second output of recirculation output 912.

Sync character detector 920, which has its input coupled to the output of delay line 916, includes means for producing as an output therefrom a 1 millisecond duration pulse only in response to the receipt of six successive binary bits each and every one of which manifest a binary one. The output pulse from sync character detector is applied as a second input to recirculation loop 918 to close the gate between the input and first output of recirculation loop 918 and to open a gate between the input and a second output of recirculation loop 918, which comprises output of data integrating discriminator and collation means 332. Thus, during the millisecond subsequent to the detection of the sync character by sync detector 920, the information in delay line 916 is read out, rather than recirculated.

Summing amplifier 914, delay line 916, recirculation loop 918 and sync character detector 920 constitute the collation means of data integrating discriminator and collation means 332. These collation means are required because the 64 bit data code is cyclically transmitted without any synchronism between the transmission of the first bit of each cycle of the data code and the operation of frequency divider 324, which generates a 1 millisecond readout bit every $2^{10}$ or 1,024 bit periods. Therefore, the generation of this 1 millisecond readout pulse by frequency divider 324 may occur in coincidence with any ordinal bit position of the cyclically transmitted 64 bit data code. In order to insure that the data code is read out from data integrating discriminator and collation means 332 in the proper order, it is necessary to spill the output from integrating delay line 910 into collating delay line 916 during the 1 millisecond duration of the readout pulse from frequency divider 324, regardless of the order in which the data code is read out of integrating delay line 910, and then monitor the output of collation delay line 916 with sync character detector 920, while maintaining recirculation of the stored information, until the sync character consisting of six consecutive bits manifesting the binary value one is detected, after which the recirculation loop may be opened and the data code bits read out in their proper order.

The reason that this is true is because of the selected format of the binary data code, wherein the 1, 8, 14, 20, 26, 30, 38, 44, 50, 56 and 61 bits of the binary data code are preselected to always manifest the binary value "zero". Therefore, not only does the sync character include six consecutive binary bits manifesting the value "one", which compose the second to seventh bits in each cycle of the binary data code, but because of the fact that the 8, 14, 20, 26, 32, 38, 44, 50, 56 and 61 bits of the binary code permanently manifest binary "zeroes" it is not possible for six consecutive bits of the data code to manifest the binary value "one", except in the case of the sync character itself.

Referring back to FIG. 3, as mentioned earlier the output pulse of variable pulse delay means 800 of range and alarm gate means 322 is applied over conductor 810 as a first input to range analog to digital converter 330. In addition, either clock pulses from clock pulse generator 304 or pulses on conductor 210 from transponder II 300 are selectively applied through lower switch contact 326 of switch 302 as a second input to range analog to digital converter 430. It will be seen that the time interval between the occurrence of a pulse of the second input to range analog to digital converter 330 and the next pulse occurring on conductor 810, which is applied as a first input to range analog to digital converter 330, is proportional to the range to that other craft which is then under consideration. Range analog to digital converter 330 includes means well known in the art responsive to the duration of this time interval for deriving as an output therefrom a series of binary bits which digitally manifest the value of the range to this other craft consideration. The output from range analog to digital converter 330 is applied as a first input to data readout control and alpha-numeric display means 336. The output from data integrating discriminator and collation means 332 is applied as a second input to display means 336. And the output appearing on conductor 812 of range and alarm gate means 322 is applied as a third input to display means 336.

Data readout control and alpha-numeric display means includes character detectors for decoding each of the variable digital data characters, such as height, air speed, identification, etc., shown in the data code format of FIG. 10, which is applied as a second input to display means 336 from data integrating discriminator and collation means 332. In addition a character detector is provided for decoding the range character applied as a first input to display means 336 from range analog to digital converter 330. The alpha-numeric display means may be digital indicator gas tubes which are responsive to the decoded characters. In addition, means 336 may include auto-pilot control means which, under certain conditions, can make use of the data fed as first and second inputs thereto for automatically controlling the piloting of the craft on which the interrogation-responder station on FIG. 3 is located. One such condition may be an alarm condition evidenced by an alarm signal on conductor 812 being applied as a third input to display means 336. If desired, the automatic pilot control means may include a computer responsive to the data applied as first and second inputs to display means 336.

Referring now to FIG. 11, there is shown an air control interrogator responder station, which is located on the ground at an airport. The air control interrogator responder station is in most respects identical to the craft interrogator responder station shown in FIG. 3. In particular, elements 1104, 1106, 1108, 1110, 1112, 1114, 1115, 1116, 1120, 1124, 1128, 1130, 1132, and 1136 of FIG. 11 are identical in structure and function to corresponding elements 304, 306, 308, 310, 312, 314, 315, 316, 320, 324, 328, 330, 332 and 336 of FIG. 3. However, the air control interrogator responder station differs from the above discussed craft interrogator responder station by including a radar 1100, which transmits exploratory pulses and receives echo pulses from rotating antenna 1102. The transmission of exploratory pulses by radar 1100 is synchronized by clock pulses applied as a first input thereto from clock pulse generator 1104. Radar 1100 preferably includes a conventional PPI display. A pulse output from range gate means 1122, which is identical in all respects to the pulse output appearing on output conductor 812 of range and alarm gate means 322 of FIG. 3, is applied as a second input to radar 1100 and is used to provide a variable range marker displaying the range of a craft then under consideration.

Another way that air control interrogator responder station of FIG. 11 differs from craft interrogator responder station of FIG. 3 is that answering pulse receiver 1116 is provided with a highly directional antenna 1118, rather than an omni-directional antenna as in FIG. 3, which directional antenna 1118 is controlled by antenna steering means 1138. In addition, antenna steering means 1138 provides data in digital form to data readout control and alpha-numeric display means 1136 which manifests the then existing values of azimuth and elevation of directional antenna 1118.

The only other differences between the air control interrogator responder station shown in FIG. 11 and the craft interrogator responder station shown in FIG. 3 is that the air control interrogator responder does not require a transponder, a switch corresponding to switch 302 or an any alarm. Since no alarm is required, range gate means 1122 may be made somewhat simpler than range and alarm gate means 322. Otherwise, they are identical in structure and function.

The operation of the overall discriminating signaling system will now be discussed. The system is capable of two alternative modes of operation. The first mode of operation is utilized by all craft interrogator-responder stations so long as they are not in close proximity to an airport. The second mode of operation is utilized by all craft responder stations when they are in close proximity to an airport. A craft interrogator-responder station is placed in its first mode of operation by operating switch 302 of FIG. 3 so that upper switch contact 305 and lower switch contact 326 are connected to the left-hand poles of switch 302, as shown in FIG. 3. By operating switch 302 of FIG. 3 so that upper switch contact 305 and lower switch contact 326 are connected to the right-hand poles of switch 302, a craft interrogator-responder station is placed in its second mode of operation.

When a craft interrogator responder station is in its first mode of operation, clock pulses are applied as respective inputs to pseudo-random code generator 306 and carrier selection means 308 through switch contact 305, so that a 1 microsecond interrogation pulse will be transmitted from antenna 314 of that craft interrogator-responder station once every millisecond. Any other craft which are in the neighborhood of any craft interrogator-responder station which has been placed in its first mode of operation will, by means of its transponder, receive such interrogation pulses and transmit answering pulses in response thereto. This will be the case whether the transponder on any such other craft is the simple transponder I, shown in FIG. 1, or the more complex transponder II, shown in FIG. 2. Of course the transponder of any such other craft may receive interrogation pulses transmitted from more than one craft interrogator responder station. In this case, the transponder will transmit an answering pulse in response to each and every received interrogation pulse, regardless of the particular craft interrogator-responder station which originated that interrogation pulse.

When any craft interrogator-responder station is placed in its first mode of operation, its answering pulse receiver will receive answering pulses transmitted by the transponders of all other craft in its neighborhood. These received answering pulses, of course, will include answering pulses which were transmitted in response to interrogation pulses from that particular craft interrogator-responder station. However, answering pulses which were transmitted in response to interrogation pulses from other craft interrogator-responder stations will also be received.

It is required that any craft interrogator-responder station placed in its first mode of operation be capable of discriminating between those received answering pulses which were responsive to its own interrogation pulses and those received answering pulses which were responsive to interrogation pulses from other interrogator-responder stations. This is accomplished in any craft interrogator-responder station placed in its first mode of operation by means of range correlation discriminator 310, described in detail above, which correlates over a time interval equal to 1,024 consecutive bit periods the binary value manifested by each interrogation pulse transmitted from that craft interrogator-responder station, which binary value is controlled in accordance with the output from pseudo-random code generator 306 as described in detail above, with the binary value manifested by each answering pulse received during this time interval. A very high degree of correlation will exist for only those received answering pulses which were actually in response to interrogation pulses from that craft interrogator-responder station and a very low correlation will exist for only those received answering pulses which were in response to interrogation pulses from other craft interrogator-responder stations. Thus, the desired discrimination will be achieved.

Since answering pulses from a plurality of other craft at different ranges from any given craft interrogator-responder station will be received by that given craft interrogater-responder station when it is placed in its first mode of operation, range and alarm gate means 322 are provided for normally considering only desired single preselected other craft at a time, the manner more fully described above.

If the preselected other craft is one that includes the transponder II, shown in FIG. 2, the answering pulses therefrom will communicate certain information, such as its identification and/or height, air speed, etc., about this preselected other craft in accordance with a binary data code having the predetermined format shown in FIG. 10, as previously described. In order to minimize error, redundancy is provided by integrating a plurality of consecutive cycles of this data code, after which the integrated data code is read out, decoded, and the information communication thereby is visually displayed in the manner described in detail above. Also the range to this preselected other craft is determined and displayed.

In case any other craft comes closer than a predetermined range from a given interrogator-responder station craft, any data communicated from the "intruding craft" will be displayed and may be utilized to control an auto pilot of the given interrogator-responder station craft. In addition, an alarm will be sounded.

Of course, not all craft include interrogator-responder stations. As far as those craft which include only transponder I of FIG. 1 are concerned, they contribute to the overall system by providing information to craft interrogator-responder stations which are placed in their first mode of operation which enables these latter craft to avoid collision with the former craft. However there is no way that craft having only a transponder I can otherwise participate in the disclosed system.

However, as far as craft which do not include an interrogator-responder station, but which do include the transponder II and the voice radio of FIG. 2 are concerned, craft which do include interrogator-responder stations which are placed in their first mode of operation are in a position to utilize the displayed data from other craft having only a transponder II and a voice radio by communicating over voice radios 315 and 214 information which can help in avoiding collisions or might otherwise be useful to such other craft.

Although a craft interrogator-responder station when placed in its first mode of operation is highly effective in discriminating against answering pulses in response to interrogation pulses from quite a few other craft interrogator-responder stations, the extremely high traffic condition which exits in the immediate vicinity of an airport makes it undesirable for the normally present very large number of interrogator-responder station craft in the vicinity of an airport to all transmit interrogation pulses. Instead, each craft interrogator-responder station in the vicinity of an airport may be placed in its second mode of operation, by connecting switch contacts 305 and 326 of switch 302 to the right-hand poles thereof. In this case, no clock pulses are applied to carrier selection means 308 and no interrogation pulses are transmitted by such craft interrogator-responder stations. However, interrogation pulses are transmitted by the air control interrogator-responder station, shown in FIG. 11, situated at the airport. Each craft in the vicinity of the airport will receive interrogating pulses from the air control interrogator-responder station and transmit its answering pulses by means of its transponder.

The transponder of any given craft interrogator-responder station when in its second mode of operation, in response to each interrogation pulse received from the air control interrogator responder station, will apply a timing pulse to conductor 210 thereof, as shown in FIG. 3, which will be forwarded to range analog to digital converter 330 and to range and alarm gate means 322 through lower contact 326 of switch 302. The occurrence of each timing pulse manifests the beginning of a bit period for that given craft interrogator-responder station strictly for its own use. The time of the receipt of any answering pulse with respect to the time of occurrence of this timing pulse for each bit period is a measure of the range of the craft transmitting that answering pulse from the given craft interrogator-responder station receiving that answering pulse.

It is therefore possible for a craft interrogator-responder station when situated close to an airport and operating in its second mode to monitor the answering pulses transmitted by other craft in response to interrogation pulses received from the air control interrogator-responder station. Information contained in the monitored answering pulse received from a preselected other craft will be read out and displayed in the same manner as previously described when the craft interrogator-responder station was operating in its first mode. Similarly, the operation of the craft interrogator-responder station in response to an "intruding" craft coming closer than a predetermined range with respect thereto will result in the same operation of range and alarm gate means 322, alarm 334 and data readout control and alpha-numeric display means 336 as was previously described in connection with the first mode of the craft interrogator-responder station.

Since the air control interrogator-responder station is equipped with radar and its answering pulse receiver is equipped with a highly directional antenna, which provides precise information as to the azimuth and elevation of any preselected craft, the air control interrogator-responder station is in a particularly good position to use its voice radio to inform craft having a voice radio aboard of the various information available to it, which it has obtained by reading out the received data codes through the use of its radar, etc., which may be helpful to a craft with which the air control responser station is communicating. This is especially true for craft stations which are not interrogator-responder stations, but only include a transponder and a voice radio.

Although in the illustrative embodiment of the invention the craft interrogating-responder stations are intended to operate in their second mode of operation only when cooperating with an air control interrogator-responder station on the ground, it will be seen that a system could be devised in which an interrogating station is located on a satellite, either synchronous or non-synchronous. In this case, craft interrogator-responder stations of such a system, responsive to received interrogation pulses from such a satellite, could be operated in their second mode. Such a system might be useful for navigation purposes.

Although the invention has been disclosed in connection with an air collision avoidance system for illustrative purposes, the inventive concept is considered to be broader than has been previously described. More particularly, the invention covers generally the idea of providing a signaling system in which first and second different signals are received, and wherein during each of a given large number of predetermined time intervals, which may be contiguous or spaced from each other, some of the first signals received therein manifest meaningful information while the rest of the first signals and all of the second signals received therein manifest extraneous information and occur randomly with a known ratio of probability of occurrence between a randomly occurring first signal and a randomly occurring second signal. Then utilizing the statistical frequency of occurrence of the second signal during the given large number of time intervals as a measure of the proportion of received first signals which manifest extraneous information, so that the total number of received first signals may be reduced by an amount corresponding to the extraneous information contained therein, whereby the remaining first signals will be substantially only those which manifest the meaningful information.

The broad inventive concept of the signaling system set forth in descriptive terms in the above paragraph may be expressed in more quantitative terms by the following correlation function:

(3)
$$S_0 = C \sum_{1}^{n} (k_1 S_1 - k_2 S_2)$$

where C is a constant of proportionality, $S_1$ and $S_2$ are the instantaneous values of said first and second signals, respectively, some certain time after the beginning of each predetermined time interval, $k_1$ and $k_2$ are weighting constants chosen such that said known ratio is $k_2/k_1$, $n$ is said given large number, and $S_0$ is the instantaneous value of said output signal corresponding to said certain time.

In the special situation, where the probability of occurrence of a randomly occurring first signal is the same as the probability of occurrence of a randomly occurring second signal, the weighting constants $k_1$ and $k_2$ may be dispensed with.

Further, in the case where during each of a first given large number of first predetermined time intervals the occurrence of some of the first signals received therein manifest meaningful information while the rest of the first signals and all of the second signals received therein manifest extraneous information and occur randomly with a known ratio of probability of occurrence between randomly occurring first signal and second signal, and wherein during each of a second given large number of second predetermined time intervals the occurrence of some of the second signals received therein manifest meaningful information while the rest of the second signals and all of the first signals received therein manifest extraneous information and occur randomly with the same known ratio of probability, the information contemplates a signaling system which includes means for solving the following function:

(4)
$$S_0 = C \sum_{1}^{n_1} (k_1 S_1 - k_2 S_2) + \sum_{1}^{n_2} (k_2 S_2 - k_1 S_1)$$

where C is a constant of proportionality $S_1$ and $S_2$ are the instantaneous values of said first and second signals, respectively, some certain time after the beginning of each first and each second predetermined time interval, $k_1$ and $k_2$ are weighting constants chosen such that said known ratio is $k_2/k_1$, $n_1$ is said first given large number, $n_2$ is said second given large number, and $S_0$ is the instantaneous value of said output signal corresponding to said certain time.

It will be noted that in the particular case of Equation 4 where the probability of occurrence of a randomly occurring first signal is equal to the probability of occurrence of a randomly occurring second signal, so that weighting constants $k_1$ and $k_2$ can be dispensed with, and each of the first predetermined time intervals is considered to be A and each of the second predetermined time intervals is considered to be $\bar{A}$, Equation 4 will reduce to either Equation 1 or Equation 2. Therefore, the correlation function utilized in the disclosed air collision avoidance system is a special case of the more general functions given by Equations 3 and 4, respectively.

It is intended that the present invention cover a signaling system of the type described utilizing a function given by any of Equations 1 to 4 inclusive. Notice that whereas the invention is discussed in terms of a single, pre-selected pseudo-random code, this is not essential to the invention. Such an arrangement is desirable, to make the rejection of unwanted signals virtually complete, as has been explained. However, individual "noise-generators" may be used, so that every code is not only different, but non-recurring. This method results in less complete rejection of unwanted signal, but may still be useful.

What is claimed is:

1. A discriminating signaling system comprising a plurality of stations including at least one given type station
   a. said given type station including first means for generating a certain preselected binary code over an interval consisting of a predetermined plural number of successive bit periods each of which manifests either the binary value A or the binary value $\bar{A}$ in accordance with said code, second means coupled to said first means for transmitting a first signal only during each of those bit periods having the binary value A and for transmitting a second signal only during each of those bit periods having the binary value $\bar{A}$, third means for receiving a third signal and a fourth signal, and fourth means coupled to said first and third means for deriving an output signal substantially in accordance with the following correlation function:

$$S_0 = C \sum_{1}^{n} [(S_3 - S_4) A + (S_4 - S_3) \bar{A}]$$

where C is a constant of proportionality, $S_3$ and $S_4$ are the instantaneous values of said third and fourth signals, respectively, a certain time after the beginning of each successive bit period, $n$ is a certain integral number of successive bit periods, and $S_0$ is the instantaneous value of said output signal corresponding to said certain time; and
   b. at least one other station including transponder means for transmitting said third signal solely in response to the receipt thereby of said first signal and for transmitting said fourth signal solely in response to the receipt thereby of said second signal.

2. The system defined in claim 1, including a plurality of said given type stations all of which utilize the same certain preselected binary code.

3. The system defined in claim 2, wherein at least certain of said given type stations further include said transponder means.

4. The system defined in claim 1, wherein said plurality of stations include stations on moving craft.

5. The system defined in claim 1, wherein said interval includes at least several hundred pulse periods.

6. The system defined in claim 5, wherein said certain preselected binary code is a pseudo-random code.

7. The system defined in claim 1, wherein $n$ is equal to at least the predetermined plural number of bit periods in said code interval.

8. The system defined in claim 7, wherein said first means repetitively generates said code, and wherein said fourth means includes fifth means for reading out said output signal therefrom after each successive set of n consecutive bit periods.

9. The system defined in claim 1, wherein each of said first, second, third and fourth signals is a modulated pulse having a pulse width which is insignificant with respect to the duration of a bit period, the modulation of the respective pulses comprising each of said first, second, third and fourth signals being different from each other.

10. The system defined in claim 9, wherein the duration of a bit period is in the order of one thousand times the width of a modulated pulse.

11. The system defined in claim 9, wherein said modulated pulse comprising said first, second, third and fourth signals, respectively, are bursts of electromagnetic waves occurring respectively at first, second, third and fourth predetermined frequencies all of which are different from each other.

12. The system defined in claim 1, wherein said correlation function applies at all times within a bit period, whereby said certain time is any given time after the beginning of each successive bit periods.

13. The system defined in claim 12,
   c. wherein said transponder means includes receiver means for receiving said first signal and said second signal, data code means coupled to said receiver means and actuated by each receipt of either said first signal or said second signal for supplying in order each time it is actuated the next individual bit of a data binary code, and transmitting means coupled to said receiving means and said data code means for transmitting alternatively a fifth signal, a sixth signal, a seventh signal or an eighth signal, said fifth signal being transmitted only in response to the receipt of said first signal and said supplied bit manifesting a given binary value, said sixth signal being transmitted only in response to the receipt of said first signal and said supplied bit manifesting a binary value opposite to said given binary value, said seventh signal being transmitted only in response to the receipt of said second signal and said supplied bit manifesting a given binary value and said eighth signal being transmitted only in response to the receipt of said second signal and said supplied bit manifesting a binary value opposite to said given binary value, whereby said third signal is constituted of said fifth signal or said sixth signal and said fourth signal is constituted of said seventh signal or said eighth signal; and
   d. wherein said given type station further includes fifth means responsive to the receipt of either said fifth signal or said seventh signal for reproducing a data code bit manifesting said given binary value and responsive to the receipt of either said sixth signal or said eighth signal for reproducing a data code bit manifesting a binary value opposite to said given binary value, and sixth means coupled to said fourth means and said fifth means for deriving the range from said given type station to a selected other station and reading out only the data code received from said selected other station.

14. The system defined in claim 13, wherein said given type station and said other stations are each on moving craft, and wherein said sixth means includes seventh means for automatically selecting a station in response to its range from said given type station becoming less than a given distance.

15. The system defined in claim 13, wherein said first, second, fifth, sixth, seventh and eighth signals, respectively, are bursts of electromagnetic waves occurring respectively at first, second, third, fourth, fifth and sixth predetermined frequencies, all of which are different from each other, the time duration of each burst being an insignificant portion of a bit period.

16. The system defined in claim 13, wherein said binary data code includes a given number of bits, wherein said data code means is cyclically operated to cause the repetitive transmission of said binary data code from said transponder means and wherein said sixth means includes cyclically-operated storage means for separately integrating each respective ordinal bit from a predetermined number of consecutive cycles of said binary data code received from said selected other station and thereafter reading out said integrated binary data code in the proper order from said storage means.

17. The system defined in claim 16, wherein said binary data code includes a unique fixed sync character code occupying predetermined ordinal bit positions in said binary data code, and wherein said storage means includes collating means responsive to said sync character code for controlling the reading out of said integrated binary data code from said storage means in the proper order.

18. A given type station adapted for use in a discriminating signaling system including a plurality of stations, said given type station comprising first means for generating a certain preselected binary code over an interval consisting of a predetermined plural number of successive bit periods each of which manifests either the binary value A or the binary value $\overline{A}$ in accordance with said code, second means coupled to said first means for transmitting a first signal only during each of those bit periods having the binary value A and for transmitting a second signal only during each of those bit periods having the binary value $\overline{A}$, third means for receiving a third signal and a fourth signal, and fourth means coupled to said first and third means for deriving an output signal substantially in accordance with the following correlation function:

$$S_0 = C \sum_{1}^{n} [(S_3 - S_4) A + (S_4 - S_3) \overline{A}]$$

where C is a constant of proportionality, $S_3$ and $S_4$ are the instantaneous values of said third and fourth signals, respectively, a certain time after the beginning of each successive bit periods, and $S_0$ is the instantaneous value of said output signal corresponding to said certain time.

19. The station defined in claim 18, wherein said fourth means comprises a storage means for storing a signal proportional to the sum of a presently applied input signal and the signal which was stored therein an interval therebefore equal to one bit period, means including switch means coupled to said first and third means effective during each bit period manifesting the binary value A for applying said third signal with a certain phase and said fourth signal with a phase opposite to said certain phase as said input signal to said storage means and effective during each bit period manifesting the binary value $\overline{A}$ for applying said third signal with said phase opposite to said certain phase and said fourth signal with said certain phase as said input signal to said storage means, and means for effecting the readout of said storage means after n consecutive bit periods.

20. The station defined in claim 19, wherein said storage means is a recirculating delay line having a loop delay of one bit period.

21. The station defined in claim 18, wherein said fourth means comprises two separate storage means each of which store a signal proportional to the sum of a presently applied input signal thereto and the signal which was stored therein an interval therebefore equal to one bit period, means including switch means, coupled to said first and third means effective during each bit period manifesting the binary value A for applying said third signal as the input signal to one of said storage means and applying said fourth signal as the input signal to the other of said storage means and effective during each bit period manifesting the binary value $\overline{A}$ for applying said fourth signal as the input signal to said one of said storage means and said third signal as the input signal to said other of said storage means, means for effecting the readout of both said storage means after n consecutive bits, and means for producing an output signal equal to the difference in the respective outputs from said two storage means.

22. The station defined in claim 18 wherein said correlation function applies at all times within a bit period, whereby said certain time is any given time after the beginning of each successive bit period.

23. The station defined in claim 22, wherein said third means includes fifth means for receiving either a fifth signal or a sixth signal as said third signal for receiving either a seventh signal or an eighth signal as said fourth signal, and sixth means responsive to the receipt of either said fifth or said seventh signal for deriving a bit of a binary data code message manifesting a given binary value and the receipt of either said sixth or said eighth signal for deriving a bit of said binary data code message manifesting a binary value opposite to said given binary value, and wherein said given type station further includes seventh means coupled to said fourth means and said sixth means for deriving the range to a selected one of other stations which are transmitting messages in said binary data code, and for reading out only the data code received from said selected one of said other stations.

24. The station defined in claim 23, wherein said binary code message consists of a predetermined number of bits which are transmitted in order repeatedly, and wherein said seventh means includes eighth means for integrating the respective corresponding ordinal bits of a given number of consecutive repetitions of said message and ninth means for reading out the bits of said binary code message in the proper order in response to the completion of said given number of consecutive repetitions.

* * * * *

Dedication 3,755,811.—*Jack Breckman*, Haddonfield, N.J. DISCRIMINATING SIGNALING SYSTEM. Patent dated Aug. 28, 1973. Dedication filed July 9, 1973, by the assignee, *RCA Corporation*.
Hereby dedicates to the Public the entire term of said patent.
[*Official Gazette March 12, 1974.*]